United States Patent
Lambert et al.

(10) Patent No.: US 9,871,811 B2
(45) Date of Patent: Jan. 16, 2018

(54) IDENTIFYING SECURITY PROPERTIES OF SYSTEMS FROM APPLICATION CRASH TRAFFIC

(75) Inventors: John Joseph Lambert, Redmond, WA (US); Matthew Bucher, Sammamish, WA (US); Darren Canavor, Redmond, WA (US); Matthew Ryan Miller, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 914 days.

(21) Appl. No.: 12/472,096

(22) Filed: May 26, 2009

(65) Prior Publication Data
US 2010/0306847 A1 Dec. 2, 2010

(51) Int. Cl.
| | |
|---|---|
| *G06F 11/07* | (2006.01) |
| *G06F 21/00* | (2013.01) |
| *H04L 29/06* | (2006.01) |
| *G06F 21/55* | (2013.01) |
| *G06F 21/56* | (2013.01) |
| *G06F 21/57* | (2013.01) |

(52) U.S. Cl.
CPC ........ *H04L 63/1425* (2013.01); *G06F 21/552* (2013.01); *G06F 21/566* (2013.01); *G06F 21/577* (2013.01); *G06F 2221/2101* (2013.01); *G06F 2221/2115* (2013.01); *G06F 2221/2119* (2013.01)

(58) Field of Classification Search
CPC .... G06F 21/552; G06F 21/566; G06F 21/577; G06F 2221/2115; G06F 2221/2119; G06F 2221/2101; H04L 63/1425

USPC ....... 726/22–24, 3; 714/37, E11.029, 38, 52, 714/57, 752; 709/224, 203
See application file for complete search history.

(56) References Cited

U.S. PATENT DOCUMENTS

| | | | | |
|---|---|---|---|---|
| 7,010,607 | B1 * | 3/2006 | Bunton | H04L 1/24 709/228 |
| 7,380,171 | B2 * | 5/2008 | Prescott | G06F 11/0748 714/38.11 |
| 7,467,202 | B2 | 12/2008 | Savchuk | |
| 7,484,134 | B2 * | 1/2009 | Wolf | G06Q 10/107 714/46 |
| 7,802,147 | B1 * | 9/2010 | Johnson et al. | 714/41 |
| 7,861,303 | B2 * | 12/2010 | Kouznetsov et al. | 726/24 |

(Continued)

OTHER PUBLICATIONS

Bloodhou and Angelos D. Keromytisnd: Searching Out Malicious Input in Network Flows for Automatic Repair Validation; Michael E Locasto, Matthew Burnsid, Columbia University, academiccommons.columbia.edu, 2006, pp. 1-17.*

(Continued)

*Primary Examiner* — Mohammad A Siddiqi
(74) *Attorney, Agent, or Firm* — Rainier Patents, P.S.

(57) ABSTRACT

Most machines in an organization's computer network connect to the Internet and create web traffic logs which allow analysis of HTTP traffic in a simple, centralized way. The web traffic logs may contain error reports and error reports contain significant information that can be used to detect network security. By reviewing the error reports, significant information about a network and its security can be found as common sources of network security weakness may be watched for in the error reports.

22 Claims, 3 Drawing Sheets

(56) References Cited

U.S. PATENT DOCUMENTS

| | | | |
|---|---|---|---|
| 8,041,710 B2* | 10/2011 | He | G06F 17/30867 707/722 |
| 8,042,182 B2* | 10/2011 | Milani Comparetti et al. | 726/23 |
| 8,239,915 B1* | 8/2012 | Satish | G06F 21/00 713/166 |
| 2002/0042821 A1* | 4/2002 | Muret et al. | 709/223 |
| 2002/0078382 A1* | 6/2002 | Sheikh et al. | 713/201 |
| 2003/0046577 A1* | 3/2003 | Silverman | 713/200 |
| 2004/0158429 A1* | 8/2004 | Bary et al. | 702/183 |
| 2005/0018618 A1* | 1/2005 | Mualem | H04L 63/1458 370/252 |
| 2005/0108677 A1* | 5/2005 | Jain | G06F 17/30489 717/100 |
| 2005/0120273 A1 | 6/2005 | Hudson et al. | |
| 2005/0229104 A1* | 10/2005 | Franco et al. | 715/743 |
| 2006/0212942 A1* | 9/2006 | Barford et al. | 726/24 |
| 2006/0235822 A1 | 10/2006 | Raghavan et al. | |
| 2007/0006226 A1 | 1/2007 | Hendel | |
| 2007/0156585 A1* | 7/2007 | Chenthamarakshan | 705/50 |
| 2007/0162975 A1* | 7/2007 | Overton | H04L 63/1416 726/24 |
| 2008/0189788 A1 | 8/2008 | Bahl | |
| 2009/0144827 A1* | 6/2009 | Peinado et al. | 726/25 |
| 2010/0257255 A1* | 10/2010 | Phillips et al. | 709/219 |

OTHER PUBLICATIONS

Candid Wüest Desktop Firewalls and Intrusion Detection, Candid Wuest, Tutor: Marc Rennhard, Supervisor: Prof Dr. Bernhard Plattner, Diploma thesis Feb. 28, 2002, pp. 1-98.*

Microsoft Corporation, IEBlog, The Windows Internet Explorer Weblog, http://blogs.msdn.com/ie/, copyright 2009 by Microsoft Corporation.

Fox, Christopher, et al., System Center Operations Manager 2007: Operations Manager 2007 Design Guide (42-page brochure), http://download.microsoft.com/download/7/4/d/74deff5e-449f-4a6b-91dd-ffbc117869a2/OpsMgr2007_DesignGuid.doc, published Oct. 2008.

Russinovich, Mark E., et al., Microsoft Windows Internals: Microsoft Windows Server 2003, Windows XP, and Windows 2000. Washington: Microsoft Press, 2005. http://www.vcfans.com/download/60/.

FileNet Corporation, Report Manager System Administrator's Handbook (Release 5.0a), copyright 1994, 2007 by FileNet Corporation. California, Feb. 2009. ftp:/ftp.software.ibm.com/software/data/cm/filenet/docs/reportdoc/50x/RM_50a_SysAdmin_Guide.pdf.

* cited by examiner

US 9,871,811 B2

IDENTIFYING SECURITY PROPERTIES OF SYSTEMS FROM APPLICATION CRASH TRAFFIC

BACKGROUND

This Background is intended to provide the basic context of this patent application and it is not intended to describe a specific problem to be solved.

Network security personnel face numerous obstacles to their ability to monitor their network for security weaknesses, policy violations and intrusions. For example, the network security personnel do not control all the machines, as guests connect to the networks and even user's set up systems without the network security personnel knowing or approving. As another example, preferred security agents may not be present on all systems as the cost may be prohibitive, the sphere of control may be limited, there may be incompatible systems, etc. As hard as it may be to believe, network security personnel may not have administrative rights on all systems in communication with the network as they may only have rights to audit systems and not fully inspect them.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This application discloses a way to assess security properties of systems. Most machines in an organization's computer network connect to the Internet. The connection may be through an Internet access point such as one or more proxy servers or a firewall that routes traffic directly to the Internet. Web traffic logs may be created by applications or by access points and the web traffic logs may allow the analysis of HTTP traffic in a simple, centralized way. The web traffic logs may contain computer error reports and computer error reports may contain significant information that can be used to detect network security. By reviewing the error reports, significant information about a network and its security can be found as common sources of network security weakness may be watched for in the error reports.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
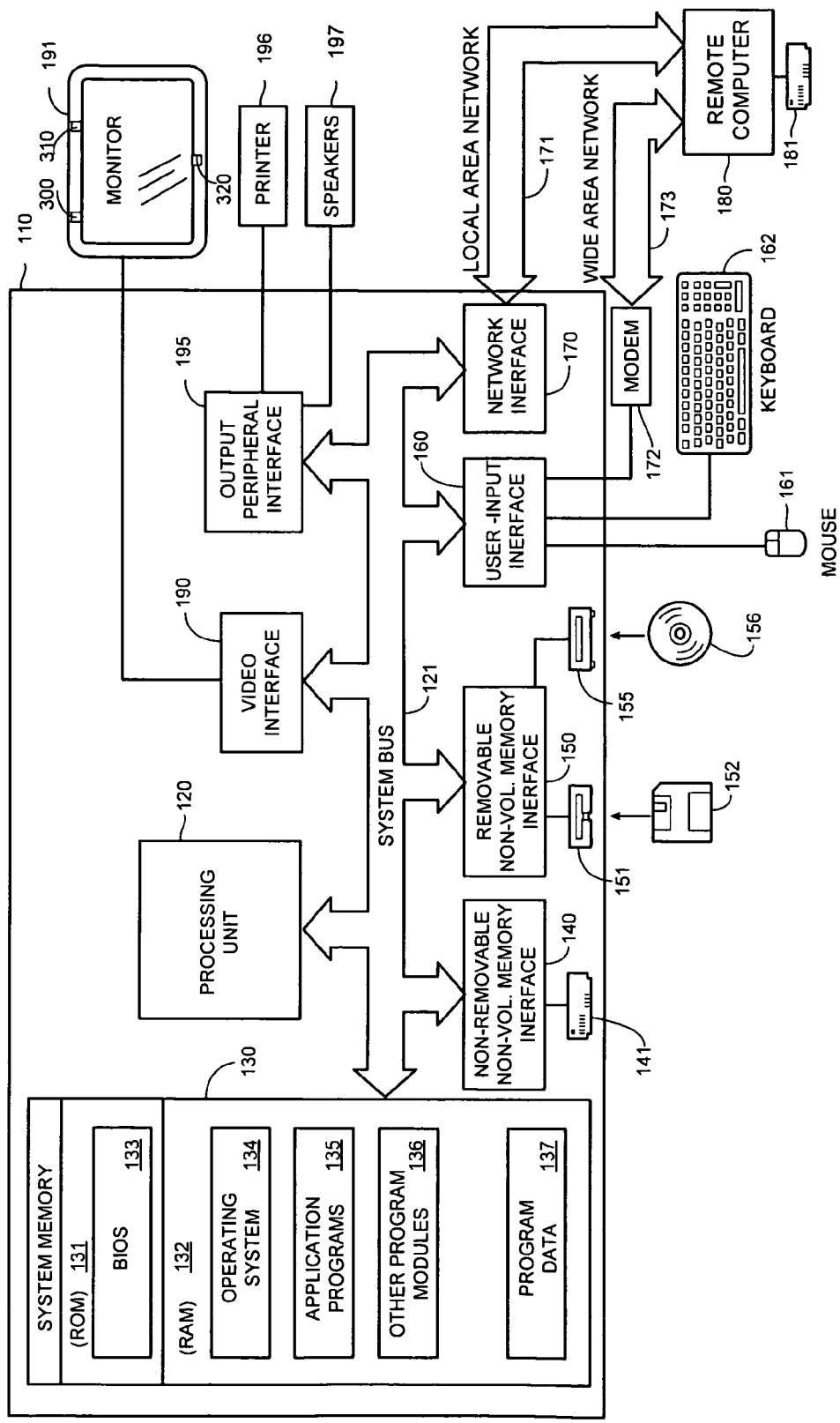
FIG. 1 is an illustration of a computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
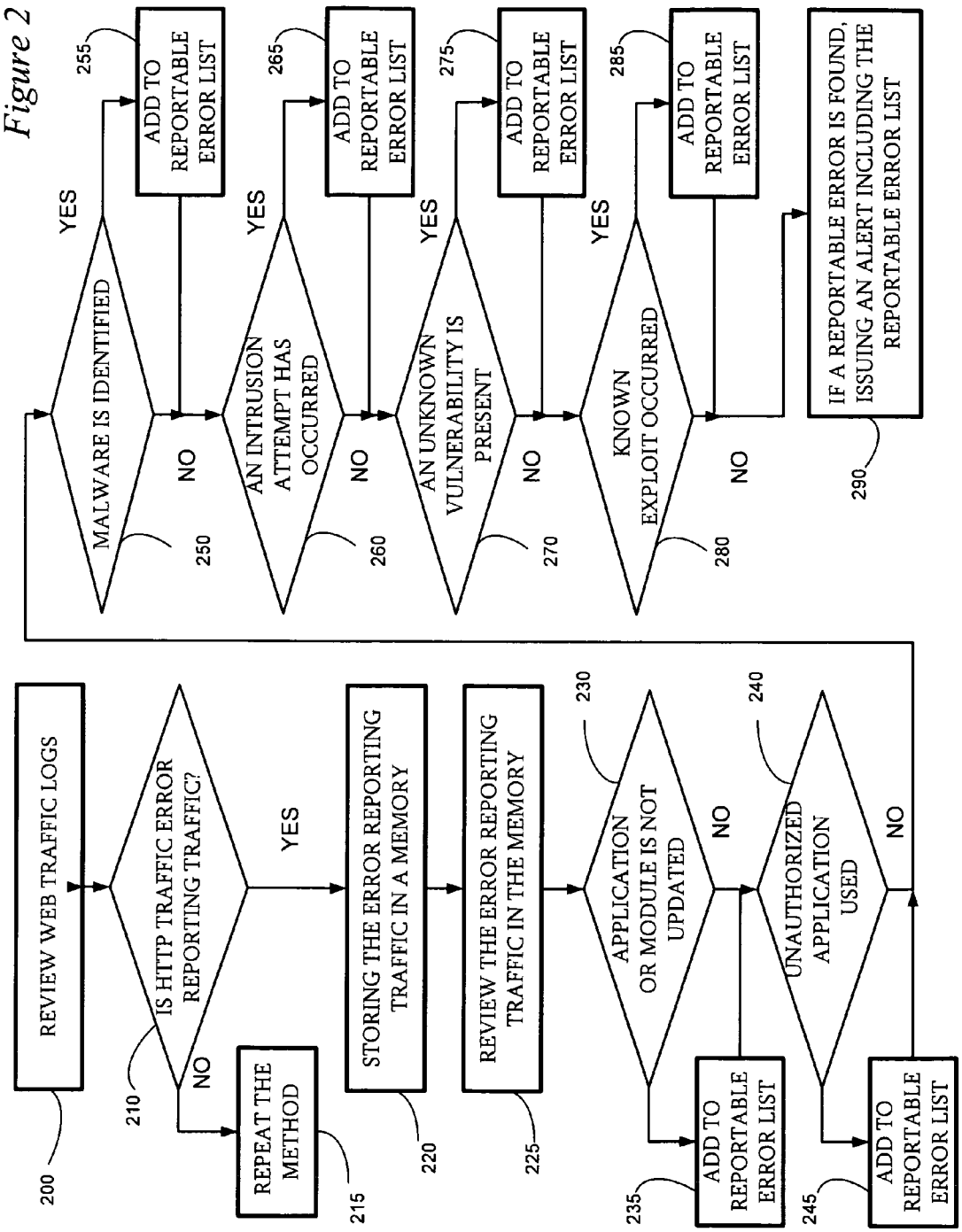
FIG. 2 is an illustration of a method of monitoring network traffic for undesired states of computing devices connected to the network.

FIG. 2 illustrates one of many possible embodiments of a method of monitoring network traffic for undesired states of computing devices connected to the network. Network security personnel face numerous obstacles to their ability to monitor their network for security weaknesses, policy violations and intrusions. For example, the network security personnel do not control all the machines, as guests connect to the networks and even user's set up systems without the network security personnel knowing or approving. As another example, preferred security agents may not be present on all systems as the cost may be prohibitive, the sphere of control may be limited, there may be incompatible systems, etc. As hard as it may be to believe, network security personnel may not have administrative rights on all systems in communication with the network as they may only have rights to audit systems and not fully inspect them.

As a result, network security personnel may not be able to fully assess the risks on a network. For example, the network security personnel may not be able to tell is network users are running all the required patches, whether unauthorized software is running, whether there have been any intrusion attempts, whether any systems are running malware (malicious software), etc. Malware may be a general term used by computer professionals to mean a variety of forms of hostile, intrusive, or annoying software or program code that is not desired by the network security personnel.

The method may be a way to approach the problems facing network security personnels. Many operating systems and applications create and communicate error reports when crashes or problems occur. These error reports are communicated in a variety of ways such as through a network or through the Internet. The communication of the error reports may create web traffic logs which may be analyzed. The data sources of the web traffic logs may be from multiple security controls, include, for example and not limitation, proxy servers, firewalls, event logs, intrusion detection systems, (IDS), intrusion prevention systems (IPS), and anti-virus scanners By analyzing the web traffic logs for HTTP traffic including URLs of the HTTP traffic, useful information may be obtained.

At block 200, web traffic logs may be reviewed. The proxy server is just one logical location to look for web traffic logs. There are numerous places to capture useful crash traffic from web traffic logs. Just as possible as reviewing web traffic logs in proxy servers is searching routers or other network capture point such as firewalls, event logs, intrusion detection systems, (IDS), intrusion prevention systems (IPS), and anti-virus scanners. Similarly there are other places to look in the host to see this activity (the Windows Error Reporting (WER) service, using a Layer Service Provider (LSP), etc)

At block 210, it may be determined whether the HTTP traffic in the web traffic logs is to and from an error reporting service. A common error reporting service is Dr. Watson from Microsoft Corporation®. In some embodiments, a list of known error reporting services may be known and may be compared to the address of the HTTP traffic in the web traffic logs. In other embodiments, an outside source may be checked for a list of the most recent error reporting sites. In still further embodiments, the data inside the local computer event logs that may be part of the HTTP traffic may be reviewed to see if it matches any known event logs for error reporting purposes. If the HTTP traffic inside the web traffic log is determined to not be error reporting traffic, at block 215, additional traffic may be reviewed in the same source or in additional sources (the method may repeat) or the method may end. If the traffic in the web traffic log is determined to be error reporting traffic, at block 220, the error reporting traffic maybe stored in a memory. The memory may be any appropriate memory such as RAM 132, or remote memory, etc.

At block 225, the error reporting traffic, may be reviewed for a reportable error. The reportable error may be any error that may be of interest to the network security personnel. Some reportable errors may be obvious threats such as malware and other reportable errors may vary by the network. For example, some networks may block bandwidth intensive applications which may not necessarily be offensive on another network. What is a reportable error may be set initially by the network security personnel, may come set as part of the application, may follow guidelines from a remote source, or may be adjusted by the network security personnel.

Figure 3:
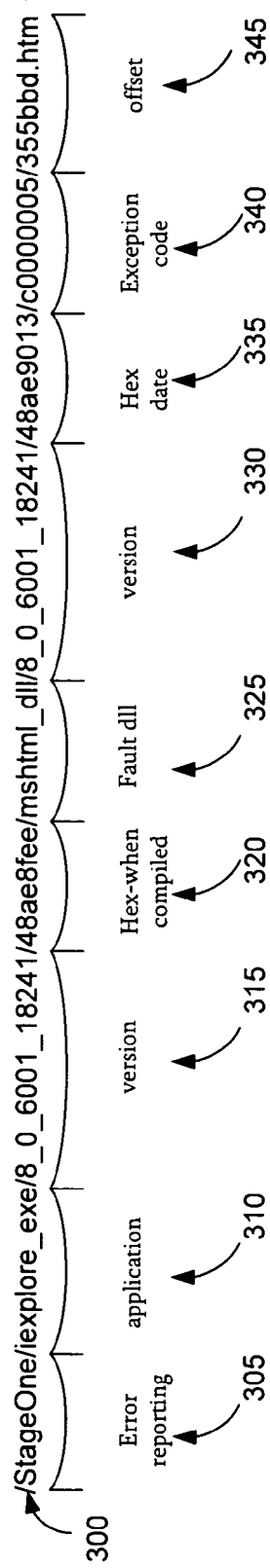
FIG. 3 is an illustration of a sample error report.

FIG. 3 may illustrate a sample error description. Of course, other error descriptions are possible and are contemplated. The following are some sample error description formats:

/StageOne/<appname>/<app version>/<app timestamp>/
<module name>/<mod version>/<mod timestamp>/<exceptioncode>/
<offset>.htm
or
/StageOne/<appname>/<app version>/<module name>/<mod version>/
<exceptioncode>/<offset>.htm
or
/StageOne/Generic/BEX/<appname>/<app version>/<app timestamp>/
<module name>/<mod version>/<mod timestamp>/<exceptioncode>/
<offset>.htm In FIG. 3:

StageOne may indicate this is an error report notation 305;

Iexplore_exe may indicate the application name 310 involved with the error;

8_0_6001_18241 may indicate the application version 315;

48ae8fee may indicate the application timestamp 320 (in hex);

mshtml_dll may indicate the module name 325 in the application that was involved in the crash 8_0_6001_18241 may indicate the module version 330;

48ae9013 may indicate the module time stamp 335 c0000005 may indicate the exception code 340; and

355bbd may indicate the offset.

Referring again to FIG. 2, at block 230, it may be determined whether the error relates to the application version 315 or module 330 not being updated. By defining a rule about the latest patched version of a binary, one may examine the version of the crashing app or module, and identify that it is not fully patched. For example:

mshtml_dll/8_0_6001_18241/48ae9013 where latest is mshtml/8.00.6001.18372/496F0C09

The update information 315 330 regarding the most recent versions may be pushed to the analyzing application periodically, may be retrieved by the method from a remote source or may be acquired on demand. The comparison may simply compare the version numbers and if the version of the application 315 or module 330 is too far in the past, the error may be added to a reportable error list at block 235. In some embodiments, statistics are kept to determine the most common application 315 and module 330 errors to see if the problem is network specific or is widespread.

At block 240, it may be determined whether the error relates to an unauthorized application 310 was being used. The security policy of the network may disallow certain program such as peer-to-peer applications. One can define a list of forbidden programs and watch for their crashes. For example:

/StageOne/skype_exe/ would indicate that a user is running skype.exe on the network which may be forbidden. Determining that an unauthorized application was being used may entail comparing an application name 310 in the error reporting traffic 300 to a list of unauthorized applications. The list may be local, may be remote, may be updated periodically, may be pushed to the user, may be obtained on demand for the user, etc. Users or administrators also may be permitted to create or modify the list of unauthorized applications 310. If an unauthorized application 310 is located, it may be add to the reportable error list at block 245.

At block 250, it may be determined if malware is present. Malware crashes often as it usually is poorly tested or encounters an environment for which it was not designed (a virtual machine or host intrusion prevention system). It is common for malware to masquerade as a Windows binary but in some cases the malware may have all commercial markings stripped.

/StageOne/csrs_exe/0_0_0_0/ntdll_dll/5_1_2600_2180/0001888f.htm

A program with a name similar to a Windows binary 310 has crashed with a zero'd file version 315. A zero'd file version may be an indication of malware.

/StageOne/svchost_exe/0_0_0_0/2a425e19/
StackHash_e52f/0_0_0_0/00000000/c0000005/00024542.htm A program with a name similar to a Windows binary 310 with a zero'd file version 315 has crashed with a timestamp (2a425e19) 320 known to indicate that it is "packed" or compressed. The timestamp 320 of 2a425e19 is Fri Jun. 19 15:22:17 1992 which cannot be a valid compilation date for the binary because it pre-dates even the conception of the svchost program 310 which again would indicate malware. Anti-virus signatures also may be used to identify malware. If malware is located, it may be add to the reportable error list at block 255.

At block 260, it may be determine if an intrusion attempt has occurred. When an exploit for a vulnerability fails, the most likely result is that the program will crash. This is because in attempting the exploit the intruder likely has altered the internal state of the program making it unstable and thus prone to crash /StageOne/svchost_exe/5_1_2600_3264/
NETAPI32_dll/5_1_2600_3264/00018ae1.htm The above string may indicate that CVE-2008-4250 was attempted to be exploited A program may utilize one or more defensive techniques (aka mitigations) like /GS, DEP, HeapTerminateOnCorrupt. By analyzing the exception code in the crash string, it reveals whether one of these "digital defenses" was triggered which may indicate an attack was attempted.

/StageOne/Generic/BEX/dns_exe/5_2_3790_1830/
42435c29/dns_exe/5_2_3790_1830/42435c29/0003d68b/
c0000409/00000000.htm The exception code 340 may indicate a stack buffer overrun protection was triggered.

In the case below, an exploit of IE is suspected because the crash offset matches patterns used in known attack techniques.

/StageOne/iexplore_exe/7_0_6000_16575/470c3339/
StackHash_e52f/0_0_0/c0000005/0c0c0c0c.htm The above string may indicate an unknown Internet Explorer 310 exploit Similarly, an exploit of Acrobat Reader 310 is suspected because the crash offset matches patterns used in known attack techniques. This shows how this technique can be used for applications made by any vendor, not just those coming from Microsoft.

/StageOne/Generic/BEX/Acrobat_exe/7_0_8_218/
446abede/unknown/0_0_0_0/0c0c0c0c/c0000005/8.htm The above string may indicate an unknown Internet Explorer exploit.

If an intrusion attempt is located, it may be add to the reportable error list at block 265.

At block 270, the method may determine that the error report indicates an unknown vulnerability is present. For example, an exploit of Acrobat Reader that uses a new, unknown vulnerability (aka "zero-day") may be suspected because the crash offset matches patterns used in known attack techniques AND the version of Adobe Reader is fully patched.

/StageOne/Generic/BEX/AcroRd32_exe/_1_0/446abede/
unknown/0_0_0_0/0c0c0c0c/c0000005/8.htm The above string may indicate a "zero day" exploit. If an unknown vulnerability is found, at block 275, it may be added to the reportable error list.

At block 280, the method may also determine whether known exploits have been used again a computing device 110 on the network. The known exploits may be preprogrammed, may be communicated by updates, may be pulled from a web site or from another application or may be obtained in any other appropriate manner. If a known exploit has occurred or is found, at block 285, it may be added to the reportable error list.

Finally, at block 290, if a reportable error is found, an alert may be issued that the reportable error was located. The alert may be in virtually any form that will trigger a sensor response from the network security personnel. The alert may be modified and adjusted as desired.

The HTTP 200 response may contain "bucket information" that allows one to identify an attack:

```
Bucket=769034526           <-- CVE-2008-4250 attack
BucketTable=1
Response=http://oca.microsoft.com/resredir.aspx?SID=
14356&iBucketTable=1&iBucket=769034526
```

The same content in these URLs appears in the event log under Event ID 1001/ Source="Windows Error Reporting" or Application Error Event ID 1000. Examples:
Fault bucket 454845631, type 5
Event Name: AppHangXProcB1
Response: None
Cab Id: 0
Problem signature:
P1: iexplore.exe
P2: 8.0.6001.18372
P3: 496f0a55
P4: 2264
P5: 16936
P6: iexplore.exe
P7: 8.0.6001.18372
Faulting application svchost.exe_NlaSvc, version 6.0.6001.18000, time stamp 0x47919291, faulting module wuapi.dll, version 7.2.6001.788, time stamp 0x48f7aa8f, exception code 0xc0000005, fault offset 0x000000000003581d, process id 0x121c, application start time 0x01c98bf4320c8c6c.

The method uses a common event stream for security properties. It benefits from the fact that HTTP traffic is usually centrally monitored and that alerts can already be raised by existing monitoring systems. By the correct interpretation of the crash parameters, unhelpful crash values are transformed into actionable information.

The method also allows for a significant amount of customization by network security personnel or other administrators. The rules to locate reportable errors are fairly straightforward and logic may be used to automate their creation. For example 1. Malware rules can be generated as a part of writing anti-virus signatures;
2. Prohibited application rules can be generated by taking a list of prohibited applications;
3. Patch level rules can be generated by taking the patch version information in vendor's security advisories; and
4. Intrusion heuristics can come from known patterns in attack techniques.

Of course, other logical extensions to create rules are possible and are contemplated.

Other intrusion information may come from analysis of crash reports and identification of the vulnerable instruction that causes the crash when it processes malicious input. This module+offset may be useful to identifying the crash as a particular Common Vulnerabilities and Exposures (CVE). Because the offset may vary among the many vulnerable versions of a module, one can map a known vulnerable crashing instruction in one binary to another by resolving the instruction to a line of code and searching for that line of code in the other versions and mapping it back to the associated memory read or write that causes the crash.

The web traffic logs also may be monitored to create a inventory of what applications are operating on a network and how often problems, such as a crash, occur on the network. This inventory may be used by an administrator to trouble shoot the most common problems or to identify new problems, increasing problems, etc.

Home grown applications or proprietary application also may be monitored by reviewing the web traffic logs. Home grown applications may not have built in error reporting mechanisms but by monitoring the web traffic logs, the identification the home grown application may appear in crash data in the web traffic logs of other applications, such as an operating system.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A method performed by a computer processing unit, the method comprising:
    obtaining, from a network capture point that connects a first network to a second network, a network traffic log reflecting communications of multiple computing devices on the first network that connect to the second network through the network capture point;
    distinguishing error reporting traffic in the network traffic log from other network traffic in the network traffic log using a known characteristic of the error reporting traffic, wherein the error reporting web traffic includes:
        first error reporting traffic sent by a first computing device through the network capture point to an error reporting service, wherein the first error reporting traffic sent by the first computing device through the network capture point to the error reporting service reports that a first crash or problem involving a first application has occurred on the first computing device, and
        second error reporting traffic sent by a second computing device through the network capture point to the error reporting service, wherein the second error reporting traffic sent by the second computing device through the network capture point to the error reporting service reports that a second crash or problem involving a second application has occurred on the second computing device;
    reviewing the first error reporting traffic to identify a first reportable error that indicates a cause of the first crash or problem;
    reviewing the second error reporting traffic to identify a second reportable error that indicates a cause of the second crash or problem; and
    outputting the first reportable error and the second reportable error.

2. The method of claim 1, wherein the reviewing the first error reporting traffic comprises:
    detecting that an unauthorized application has crashed by comparing an application name in the first error reporting traffic to a list of unauthorized applications; and
    identifying the unauthorized application in the first reportable error.

3. The method of claim 1, wherein the reviewing the first error reporting traffic comprises:

detecting that an individual application that has crashed is malware by determining that the first error reporting traffic comprises a particular file version number; and
identifying the malware in the first reportable error.

4. The method of claim 1, wherein the reviewing the first error reporting traffic comprises:
detecting that an individual application that has crashed is malware based at least on a file date stamp of a corresponding application that is named in the first error reporting traffic; and
identifying the malware in the first reportable error.

5. The method of claim 1, wherein the reviewing the first error reporting traffic comprises:
detecting an intrusion attempt by determining that an individual application that has crashed triggered a digital defense that is identified in the first error reporting traffic; and
identifying the intrusion attempt in the first reportable error.

6. The method of claim 1, wherein the reviewing the first error reporting traffic comprises:
detecting an exploit by determining that a crash offset in the first error reporting traffic matches a crash offset pattern used in known attack techniques; and
identifying the exploit in the first reportable error.

7. The method of claim 1, wherein the reviewing the first error reporting traffic comprises:
detecting that an individual application that has crashed is not up to date based at least on a version of the individual application included in the first error reporting traffic; and
identifying the individual application in the first reportable error.

8. The method of claim 1, wherein the reviewing the first error reporting traffic comprises detecting an anti-virus signature in the first error reporting traffic.

9. The method of claim 1, wherein the reviewing the first error reporting traffic comprises:
detecting an unknown vulnerability when the first error reporting traffic indicates that an individual application that has crashed is fully patched and includes a crash offset that matches patterns used in known attack techniques; and
identifying the individual application in the first reportable error.

10. The method of claim 1, wherein the network traffic log comprises web traffic.

11. A computer system comprising:
a computer processing unit; and
computer executable instructions which, when executed by the computer processing unit, cause the computer processing unit to:
obtain, from an access point that connects a first network to a second network, a network traffic log reflecting network communications of multiple computing devices on the first network that connect to the second network through the access point;
distinguish error reporting traffic in the network traffic log from other network traffic in the network traffic log using a known characteristic of the error reporting traffic, wherein the error reporting web traffic includes:
first error reporting traffic sent by a first computing device through the access point to an error reporting service, wherein the first error reporting traffic sent by the first computing device through the access point to the error reporting service reports that a first crash or problem involving a first application has occurred on the first computing device, and
second error reporting traffic sent by a second computing device through the access point to the error reporting service, wherein the second error reporting traffic sent by the second computing device through the access point to the error reporting service reports that a second crash or problem involving a second application has occurred on the second computing device;
review the first error reporting traffic to identify a first reportable error that indicates a cause of the first crash or problem;
review the second error reporting traffic to identify a second reportable error that indicates a cause of the second crash or problem; and
output the first reportable error and the second reportable error.

12. The computer system according to claim 11, wherein the first network is associated with an organization, the second network is the Internet, and the first error reporting traffic and the second error reporting traffic are sent through the access point to the Internet before being received by the error reporting service over the Internet.

13. The computer system according to claim 11, wherein the computer executable instructions, when executed by the computer processing unit, further cause the computer processing unit to:
identify the first error reporting traffic and the second error reporting traffic in the network traffic log using an error description format used for error reporting to the error reporting service, wherein the first error reporting traffic and the second error reporting traffic conform to the error description format and the other network traffic in the network traffic log does not conform to the error description format.

14. The computer system according to claim 11, wherein the computer executable instructions, when executed by the computer processing unit, further cause the computer processing unit to:
distinguish the first error reporting traffic and the second error reporting traffic from the other network traffic in the network traffic log by identifying an address of the error reporting service in the first error reporting traffic and the second error reporting traffic.

15. The computer system according to claim 11, wherein the first error reporting traffic and the second error reporting traffic are destined for the error reporting service and the other network traffic is destined for destinations other than the error reporting service.

16. The computer system according to claim 11, wherein the computer executable instructions, when executed by the computer processing unit, further cause the computer processing unit to:
analyze the first error reporting web traffic and the second error reporting traffic to determine how often crashes occur on the first network.

17. A computer storage device or memory device comprising computer executable instructions that physically configure a computer processing unit to perform acts comprising:
obtaining, from a network device that connects a first network to a second network, a network traffic log reflecting communications of multiple computing devices on the first network that send the communications to the second network through the first network and the network device;

distinguishing error reporting traffic in the network traffic log from other network traffic in the network traffic log using a known characteristic of the error reporting traffic, wherein the error reporting web traffic includes:
first error reporting traffic sent by a first computing device through the network device to an error reporting service, wherein the first error reporting traffic sent by the first computing device through the network device to the error reporting service reports that a first crash or problem involving a first application has occurred on the first computing device, and
second error reporting traffic sent by a second computing device through the network device to the error reporting service, wherein the second error reporting traffic sent by the second computing device through the network device to the error reporting service reports that a second crash or problem involving a second application has occurred on the second computing device;
reviewing the first error reporting traffic to identify a first reportable error that indicates a cause of the first crash or problem;
reviewing the second error reporting traffic to identify a second reportable error that indicates a cause of the second crash or problem; and
outputting the first reportable error and the second reportable error.

18. The computer storage device or memory device of claim 17, wherein the first error reporting traffic comprises web traffic.

19. The computer storage device or memory device of claim 18, wherein the outputting comprises:
in issuing a first alert that the first reportable error was located on the first computing device; and
issuing a second alert that the second reportable error was located on the second computing device.

20. The computer storage device of claim 19, wherein the first computing device, the second computing device, and the first network are associated with an organization, the second network comprises the Internet, and the network device from which the network traffic log is obtained connects the first network associated with the organization to the Internet.

21. A method performed by a computer processing unit, the method comprising:
obtaining, from a network capture point that connects a first network to the Internet, one or more web traffic logs reflecting web communications of multiple computing devices on the first network that send the web communications to the Internet through the first network and the network capture point;
distinguishing error reporting web traffic from other web traffic in the one or more web traffic logs obtained from the network capture point by evaluating the one or more web traffic logs using one or more known characteristics of the error reporting web traffic, wherein the error reporting web traffic includes:
first error reporting traffic sent by a first computing device through the network capture point to an Internet error reporting service, wherein the first error reporting traffic sent by the first computing device through the network capture point to the Internet error reporting service reports that a first crash or problem involving a first application has occurred on the first computing device, and
second error reporting traffic sent by a second computing device through the network capture point to the Internet error reporting service, wherein the second error reporting traffic sent by the second computing device through the network capture point to the Internet error reporting service reports that a second crash or problem involving a second application has occurred on the second computing device;
reviewing the first error reporting traffic to identify a first reportable error that indicates a cause of the first crash or problem;
reviewing the second error reporting traffic to identify a second reportable error that indicates a cause of the second crash or problem; and
outputting the first reportable error and the second reportable error.

22. The method of claim 21, wherein the distinguishing the error reporting web traffic from the other web traffic in the one or more web traffic logs obtained from the network capture point comprises determining that the error reporting web traffic is destined for the error reporting service and the other web traffic is destined for Internet locations other than the error reporting service.

* * * * *